United States Patent
Anderton et al.

[11] Patent Number: 6,045,200
[45] Date of Patent: Apr. 4, 2000

[54] TRACK BUSHING HAVING IMPROVED ABRASION AND GALLING RESISTANCE

[75] Inventors: Peter W. Anderton; Chuong Q. Dam, both of Peoria; Alan P. Dremann, Edelstein; William A. Holt, Dunlap, all of Ill.; Phil J. Shankwitz, Troy, N.C.

[73] Assignee: Caterpillar Inc., Peoria, Ill.

[21] Appl. No.: 09/141,787

[22] Filed: Aug. 28, 1998

Related U.S. Application Data

[63] Continuation-in-part of application No. 08/798,813, Feb. 12, 1997.

[51] Int. Cl.$^7$ ............................................. B62D 55/21
[52] U.S. Cl. ........................... 305/104; 305/106; 305/203; 384/625
[58] Field of Search ........................ 305/100, 102, 305/103, 104, 105, 106, 202, 203, 192, 194; 384/276, 297, 625, 912, 913

[56] References Cited

U.S. PATENT DOCUMENTS

| | | | |
|---|---|---|---|
| 4,042,282 | 8/1977 | Halsett et al. | 305/194 |
| 4,199,199 | 4/1980 | Granda | 305/106 |
| 4,575,914 | 3/1986 | Armida et al. | 305/104 X |
| 4,848,934 | 7/1989 | Blakely et al. | 384/62.5 |
| 5,249,868 | 10/1993 | Watts | 384/276 |
| 5,257,858 | 11/1993 | Taft | 305/104 X |
| 5,593,234 | 1/1997 | Liston | 384/297 |
| 5,700,094 | 12/1997 | Dam et al. | 384/62.5 |

FOREIGN PATENT DOCUMENTS

| | | | |
|---|---|---|---|
| 2/39539 | 2/1979 | France | 305/192 |

*Primary Examiner*—Russell D. Stormer
*Attorney, Agent, or Firm*—William C. Perry; Maginot, Addison & Moore

[57] ABSTRACT

A track assembly for a track-type machine includes a track bushing that defines first and second end portions and first and second sealing end faces that are defined by the respective end portions. The track bushing also defines a bore that extends therethrough between the end portions thereof. A first bearing surface is defined on the bore adjacent the first end portion and a second bearing surface is defined on the bore adjacent the second end portion. An abrasion resistant coating is deposited on at least one of the first and second end surfaces and the first and second bearing surfaces. The coating is selected from the group consisting of chromium nitrides, chromium carbonitrides, and mixtures thereof.

10 Claims, 3 Drawing Sheets

TRACK BUSHING HAVING IMPROVED ABRASION AND GALLING RESISTANCE

This application is a continuation-in-part of co-pending application Ser. No. 08/798,813 filed on Feb. 12, 1997.

TECHNICAL FIELD

The present invention relates generally to track bushings for the endless tracks of a track-type machine, and more particularly to a track bushing having coated ends and internal surface for improved abrasion, corrosion and galling resistance.

BACKGROUND ART

The track bushings used in the track pins for linking the track links for the endless track of a track type machine, such as an earthmoving machine, for example, are subjected to a very severe operating environment. The ends of the track bushing and the inner surface of the track bushing adjacent its two ends are the main bearing surfaces that respectively slide against the track seal and the track pin. The dirt and debris tend to wear the ends of the track bushings sliding against the sealing surface of a track seal. This happens because the dirt and debris particles get lodged between the seal and the bushing end surface and eventually wear a groove into the end face of the track bushing. Further, the particles of dirt and debris tend to work their way into the clearance between the track pin and the bushing and eventually wear the outer surface of the track pin or the inner surface of the track bushing. This type of a wear results in metal-to-metal transfer between the track pin and the track bushing, a phenomenon called "galling".

It is desirable to provide a track bushing that has a very hard, highly corrosion resistant coating that prevents the corrosion and erosion of the end of the track bushing. It is also very desirable to provide a track bushing having a hard coating on its inner surface so as to prevent galling. It is also desirable to generally improve the surface finish of the aforementioned bearing surfaces of a track bushing so that they are more resistant to friction and wear.

The present invention is directed to overcome one or more problems of heretofore utilized track bushings for track-type machines.

DISCLOSURE OF THE INVENTION

In one aspect of the present invention, a track assembly is provided with first and second endless track chains. Each track chain has a plurality of track links that are connected to one another by a plurality of laterally extending track pins. A plurality of track bushings is connected between the track links of the first and second track chains. The bushings have first and second end portions that define respective first and second end faces and a bore that extends between the first and second end portions. The bushings are positioned about the respective track pins for relative rotation with respect thereto. A track seal, having a sealing portion, is positioned between the track links and the track bushing with the sealing portion positioned for sealing contact with the respective first and second end faces of the track bushing. An abrasion resistant coating is deposited on the first and second end faces of the track bushing. The coating is selected from the group consisting of chromium nitrides, chromium carbonitrides, and mixtures thereof.

In another aspect of the present invention, a track assembly is provided that includes first and second track chains. Each track chain defines a plurality of link members that, in turn, have first and second end portions. A plurality of track pins extend laterally between the respective first end portions of the link members of the respective track chains to interconnect the first and second track chains. A plurality of track bushings have first and second end portions, first and second sealing end faces that are defined on the respective first and second end portions, a bore that extends through the track bushing and first and second bearing surfaces that are defined on at least a portion of the bore adjacent the first and second end portions. The track bushings extend laterally between the respective second end portions of the link members of the respective track chains to interconnect the first and second track chains. The track bushings are positioned about the track pins for relative rotation therewith. A seal member, having a seal portion defined thereon, is positioned between the respective first link members of the respective track chains and the track bushing in a manner wherein the seal portion of the seal member is placed in sealing engagement with the respective first and second sealing end faces defined by the track bushing. An abrasion resistant coating is deposited on the first and second sealing end faces of the track bushings. The coating is selected from the group consisting of chromium nitrides, chromium carbonitrides and mixtures thereof.

With a track assembly as set forth above, a seal interface is created on the end faces of the track bushings that is resistant to abrasion and wear, even in the harsh environment in which a track assembly typically operates. The coating prevents premature wear of the bushing end faces and greatly increases the life of the track assembly. In addition, the bearing surfaces defined on the bore of the track bushings may be coated with the abrasion resistant material to prevent the wear phenomenon known as "galling" from occurring between the track pins and bushings. This also increases the life of the track assembly.

BEST MODE FOR CARRYING OUT THE INVENTION

Figure 1:
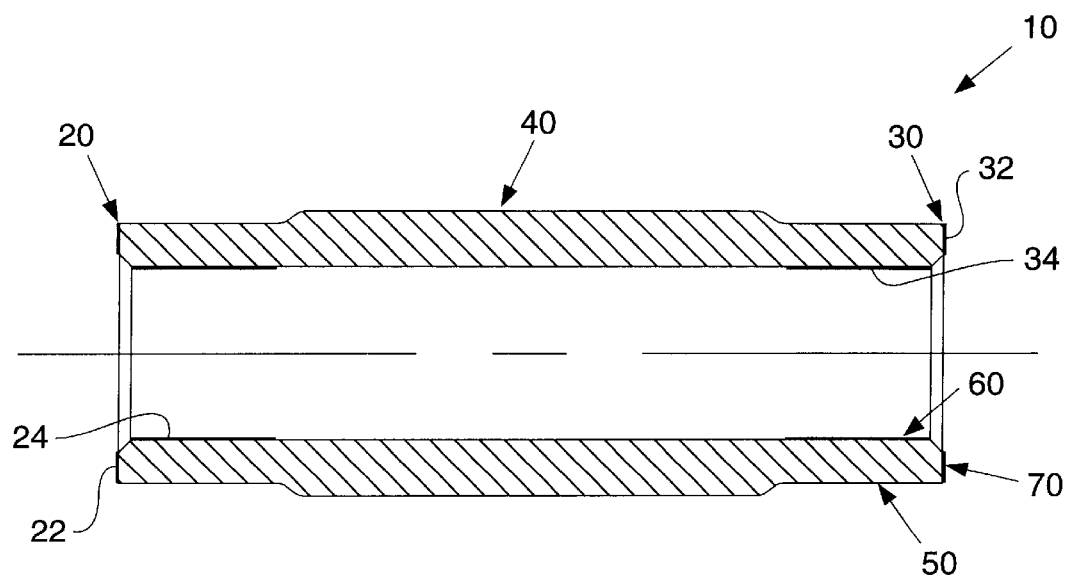
FIG. 1 is a fragmentary, diagrammatic side view of a track assembly that embodies the principles of the present invention.

Referring to FIG. 1, a track assembly 10 for a track-type machine is shown. The track assembly 10 includes a pair of endless track chains 12 and 14 that are positioned in spaced parallel relation to one another and are entrained about a track roller frame 16 of the machine. The track assembly engages a drive sprocket (not shown) that provides motive force to the track assembly, which in turn, drives the machine in a well known manner. The track is also entrained about at least one idler member 17 that rotatably supports the track assembly on one end of the track roller frame as viewed in FIG. 1.

Each track chain consists of a plurality of track links 18 that have first and second end portions 20 and 22 respectively. The first end portion 20 of each link is laterally offset from the second end portion 22 so that the first end portion of one link may be positioned in outwardly adjacent relation to the second end portion of the next link in a well known manner, as can be seen best in FIG. 2. Each end portion of each link has a bore 24 and 26 defined therethrough that are aligned along a common, laterally extending axis X.

Figure 2:
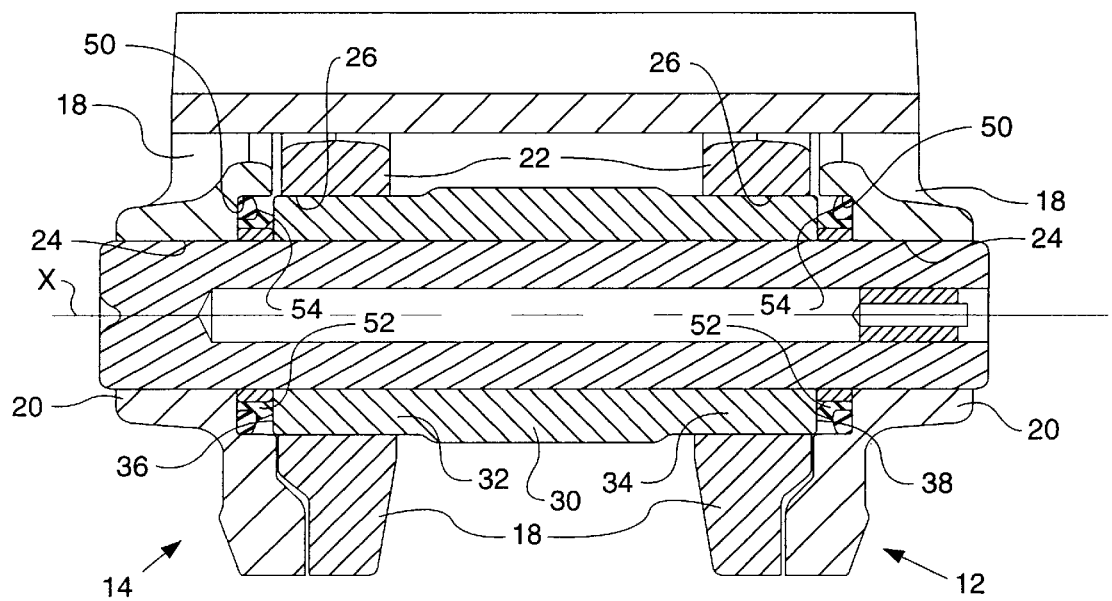
FIG. 2 is a diagrammatic section view of the track assembly as viewed along lines 2—2 of FIG. 1.

In FIG. 2, a cross-sectional view is shown that is taken through the first end portion 20 of a first pair of links 18 and a second end portion 22 of an adjacent pair of links 18. It can be seen that a track pin member 28 is positioned within the aligned bores 24 and 26 defined in the respective end portions of the adjacent links. The track pin is secured to the first end portions 20 of the first pair of links 18 by interference fit with the bores 24 or any other suitable manner to fix the position of the pin with respect to the first pair of links.

Figure 3:
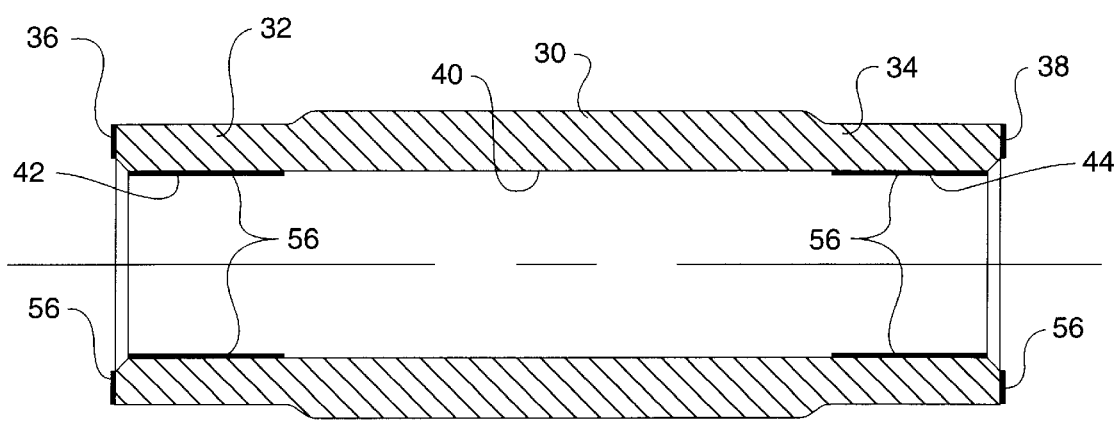
FIG. 3 is a diagrammatic, enlarged, section view of the track bushing that embodies the principles of the present invention.

A track bushing 30 is positioned about the track pin 28 and defines first and second end portions 32 and 34, respectively. The first and second end portions 32 and 34 are positioned within the bores 26 defined by the second end portions 22 of the second pair of links and is secured thereto by interference fit or other suitable means. The track bushing defines a first sealing end face 36 on the first end portion 32 thereof and a second sealing end face 38 on the second end portion 34 thereof. As is best illustrated in FIG. 3, a bore 40 is shown to extend through the track bushing between its respective end portions and is of sufficient diameter to receive the track pin 28 therein and allow relative rotation therebetween. The bore 40 further defines a first bearing surface 42 along the first end portion 32 of the track bushing and a second bearing surface 44 along the second end portion 34 of the bushing. Each sealing end face 36 and 38 of the track bushing 30 terminates at a location that is adjacent the inner extremity of the first end portions 20 of the first pair of links 18. A seal cavity 50 is defined in the first end portions of each link at a location that opposes the sealing end faces 36 and 38 of each track bushing. A seal member 52, or track seal, is positioned within the seal cavity 50 and defines a sealing lip 54 that is biased toward engagement with the respective sealing end faces 36 and 38 on each end of the track bushings 30.

An abrasion resistant coating 56 is deposited on each of the first and second sealing end surfaces 36 and 38, respectively. The coating 56 is shown in exaggerated detail in FIG. 3 for purposes of illustration. While not entirely necessary, the invention also comprehends the application of the coating to the first and second bearing surfaces 42 and 44 respectively, defined by the bore 40. The coating 56 is selected from the group consisting of chromium nitrides, chromium carbonitrides, and mixtures thereof.

In the preferred embodiment of the present invention, the coating 56 has a thickness desirably in the range of about 0.0001 mm to about 0.02 mm, and preferably, in the range of about 0.0005 mm to about 0.01 mm. A thickness less than 0.0001 mm is undesirable because the coating tends to wear too soon. A thickness greater than 0.02 mm is undesirable because the coating can spall, resulting in premature wear. Desirably, the coating deposited on the first and second sealing end surfaces and has a thickness in the range of about 0.003 mm to about 0.008 mm and preferably, about 0.005 mm.

Desirably, the coating deposited on the first and second inner bearing surfaces has a thickness in the range of about 0.0001 mm to about 0.005 mm, and preferably, about 0.002 mm. It is desirable to deposit a coating on the inner surface adjacent the first and second end portions 20 and 22, respectively, for a linear length of up to 20% of the total length of the bushing in order to obtain sufficient galling resistance. The total length of the bushing is the sum total of the lengths of the first portion, the second portion and the middle portion.

In the preferred embodiment, the abrasion resistant coating is deposited by vapor deposition techniques and is preferably deposited on both the first end bearing surface 36 and the second end bearing surface 38 to get maximum corrosion/erosion resistance. Alternatively, the abrasion resistant coating is deposited on the first inner bearing surface 42 and the second inner bearing surface 44 for maximum galling resistance as well as the first and second sealing end faces 34 and 36.

In the preferred embodiment of the present invention, the coating 56 is desirably, selected from one of chromium nitrides and chromium carbonitrides, or mixtures thereof. Preferably, the coating is chromium nitride. CrN is preferred because it has been observed during performance tests that the abrasion, corrosion/erosion and galling resistance is much superior as compared to other coatings.

The coating 56 is deposited desirably, by any one of the vapor deposition techniques, such as physical vapor deposition, chemical vapor deposition and arc vapor deposition. In the preferred embodiment of the present invention, the chromium nitride coating 56 is deposited by arc vapor deposition process which comprises the following steps: An arc source is provided and is adapted to impart a positive charge on the vapor generated. A negative bias voltage of about 50 volts is applied to the race substrate by a voltage source. A vapor deposition coating 56 is deposited on both the track bushing ends and/or the inner surfaces adjacent each end for up to about 20% of the total bushing length from either end. Such coating methods are well known to those skilled in the art of vapor deposition coating.

However, during arc vapor deposition, macroparticles having a size in the range of 0.01 $\mu$m to 0.05 $\mu$m are often produced in the vapors and these macroparticles may detrimentally affect the coating surface. Thus as an alternative, the above process may be improved in order to reduce the amount of macroparticles in the coating, such macroparticles being at least 0.01 $\mu$m in size, by providing a metallic wire mesh, preferably stainless steel having a preselected opening size desirably in the range of about 0.22 mm to about 0.86 mm, and preferably, of about 0.47 mm. The wire mesh is positioned in between the arc source and the substrate to be coated, say, the sealing end surfaces 32 and 34 for example, preferably at a distance of at least 15 mm from the respective end surfaces. A negative bias voltage of about 50 volts is applied to the wire mesh by a voltage source. The arc source provides a current in the range of about 50 Amps to about 250 Amps and imparts a positive charge on the macroparticles present in the vapor generated. The positively charged macroparticles are entrapped on the negatively biased wire mesh.

INDUSTRIAL APPLICABILITY

During the operation of a track-type machine, the track assembly 10 will revolve around a drive sprocket and at least one idler wheel 17 as it propels the machine. As it does so, the links will rotate with respect to one another as they revolve around the sprockets, idlers, and any debris they may run over. As they rotate, they rotate relative to one another about the track pins 28 and bushings 30. This relative rotation also occurs with respect to the bushings and the track seals 52. The maximum relative rotation is generally within a range of between 30 and 180 degrees depending on the configuration of the track, but is always less than a full rotation. During this rotation, the track seal is subjected to various types of abrasives depending upon the type of terrain in which the machine is operating. The seal lip 54 is biased against the sealing end faces 36 and 38 of the track bushings, which are coated with the abrasion resistant coating such as chromium nitride. Since the sealing end faces are coated as such, the wear typically experienced between the seal and the bushing is greatly reduced, even in the most abrasive environments.

In addition, the coating 56, when applied to the bearing surfaces 42 and 44, greatly reduce the galling that typically occurs between the track pin 28 and the track bushing 30 due to the relative rotation that occurs therebetween.

The abrasion, corrosion and erosion resistance used at the seal/bushing interface, coupled with the galling resistance utilized at the bearing interface between the track bushings and the track pins greatly extends the service life of a track assembly. The present invention is expected to increase the useful service life of these track bushings by as much as 500% or more.

Other aspects, objects and advantages of this invention can be obtained from a study of the drawings, the disclosure and the appended claims.

We claim:

1. A track assembly, comprising:
   first and second endless track chains, each having a plurality of track links connected to one another by a plurality of laterally extending track pins;
   a plurality of track bushings connected between the track links of the first and second track chains, said track bushings having (i) first and second end portions defining respective first and second end faces, (ii) a bore that extends between said first and second end portions, and (iii) a bearing surface defined by a portion of the bore adjacent to one of the first and second end portions of the track bushing, said track bushings being positioned about the respective track pins for relative rotation with respect thereto;
   a track seal having a sealing portion and being positioned between the track links and the track bushing with the sealing portion thereof positioned for sealing contact with the respective first and second end faces of the track bushing; and
   an abrasion resistant coating deposited on the first and second end faces of the track bushings, said coating being selected from the group consisting of chromium nitrides, chromium carbonitrides, and mixtures thereof,
   wherein the bearing surface does not have the abrasion resistant coating deposited thereon.

2. A track assembly as set forth in claim 1 wherein said coating has a thickness in the range of about 0.0001 mm to about 0.02 mm.

3. A track assembly as set forth in claim 1 wherein said coating has a thickness in the range of about 0.0005 mm to about 0.01 mm.

4. A track assembly as set forth in claim 1 wherein said coating deposited on the respective end faces defined by the track bushing has a thickness in the range of about 0.003 mm to about 0.008 mm.

5. A track assembly as set forth in claim 4 wherein said coating deposited on the first and second end faces has a thickness of about 0.005 mm.

6. A track assembly as set forth in claim 1 wherein said abrasion resistant coating is deposited by vapor deposition techniques.

7. A track assembly, comprising:
   a first track chain defining a plurality of link members, each link member having first and second end potions;
   a second track chain defining a plurality of link members, each link member having first and second end portions;
   a plurality of track pins extending laterally between the respective first end portions of the link members of the respective track chains to connect the first and second track chains;
   a plurality of track bushings having first and second end portions, first and second sealing end faces defined on said respective first and second end portions, a bore extending between the first and second end portions and first and second bearing surfaces defined on at least a portion of the bore adjacent the first and second end portions, said track bushings extending laterally between the respective second end portions of the link members of the respective track chains to connect the first and second track chains, said track bushings being positioned about the track pins for relative rotation therewith;
   a seal member having a seal portion defined thereon and being positioned between the respective first link members of the respective track chains and the track bushing in a manner wherein the seal portion of the seal member is placed in sealing engagement with the respective first and second sealing end faces defined by the track bushing; and
   an abrasion resistant coating deposited on the first and second sealing end faces of the track bushings, said coating being selected from the group consisting of chromium nitrides, chromium carbonitrides, and mixtures thereof,
   wherein either the first or second bearing surface does not have the abrasion resistant coating disposed thereon.

8. The track assembly as set forth in claim 7 wherein a seal cavity is created between the first and second end portion of each track bushing and the respective first end portions of the link members of the respective first and second track chains, said seal cavity being adapted for receiving the seal member for sealing engagement with the first and second sealing end faces defined by the track bushings.

9. The track assembly as set forth in claim 7 wherein the coating deposited on the respective end faces of the first and second end portions of the track bushing has a thickness in the range of about 0.003 mm to about 0.008 mm.

10. The track assembly as set forth in claim 7 wherein the abrasion resistant coating is of chromium nitride.

\* \* \* \* \*